March 26, 1929.  E. F. WESTMAN  1,706,908
ELECTRIC STOVE
Filed Sept. 30, 1927
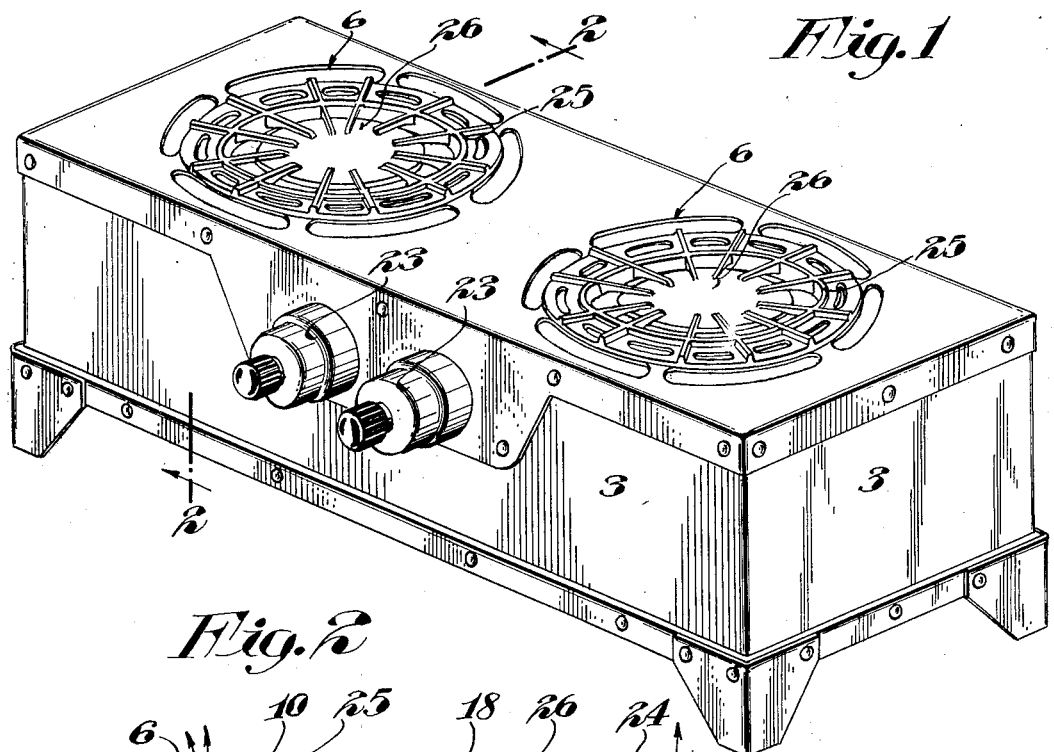
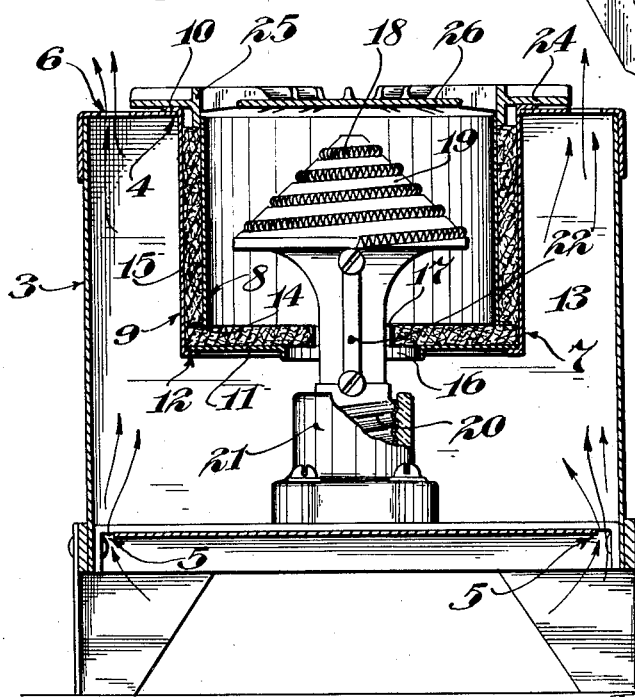
Inventor
Emil F. Westman
By his Attorneys
Merchant and Kilgore Patented Mar. 26, 1929.

1,706,908

UNITED STATES PATENT OFFICE.

EMIL F. WESTMAN, OF TONKA BAY, MINNESOTA.

ELECTRIC STOVE.

Application filed September 30, 1927. Serial No. 223,114.

My present invention has for its object the provision of an extremely simple and highly efficient electric stove, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the improved electric stove; and

Fig. 2 is a view principally in transverse vertical section taken on the line 2—2 of Fig. 1.

The stove illustrated has two burners, but may have only one or more than two, and includes, as illustrated, a leg-supported rectilinear box-like shell or body 3 having in its top two holes 4. The bottom of the body 3 is spaced from the walls thereof to leave an air intake passage 5, and a plurality of circumferentially spaced segmental air outlet passages 6 are formed in the top of the body 3 concentric with each hole 4.

A heating pot 7 is removably suspended within the body 3 through each hole 4 and includes inner and outer shells 8 and 9, respectively. Said outer shell 9 has an external flange 10 at its upper edge which rests on the top of the body 3 and holds the heating pot 7 removably suspended in said body. Said heating pot 7 also includes a bottom plate 11 loosely supported on an internal flange 12 at the lower edge of the outer shell 9 and a loose relatively thick sheet of insulating material 13 loosely supported on the bottom plate 11. The inner shell 8 has an external flange 14 which rests on the insulating member 13. An insulating material 15, such as asbestos in the form of a wick, is tightly wound between the shells 8 and 9 in compact form, and substantially completely fills the space therebetween. Obviously, this insulating material 15 overlies the external flange 14 and thereby holds the inner shell 8 against lifting movement in respect to the outer shell 9. Aligned holes 16 and 17 are formed in the bottom plate 11 and insulating material 13 at the axes thereof.

Within the heating pot 7 is a heating element 18 laid in a spiral groove formed in a core 19 of suitable insulating material which, as shown, is in the form of a toadstool. The stem of the core 19 extends through the aligned holes 16 and 17 and has on its lower end a threaded metal terminal member 20 screwed into the customary threaded terminal of an electric socket 21 secured to the bottom of the body 3. One end of the heating element 18 is connected by a fuse 22 to the terminal member 20. The other end of the heating element 18 is connected to a point contact, not shown, on the lower end of the stem of the core 19 for contact with the customary spring contact of the socket 21.

For the purpose of this case it is not thought necessary to show the wiring or electrical connections for the socket 21, except the switches 23, but it may be here stated that the connections between the heating element 18 and the socket 21 are the same as between an ordinary electric light bulb and socket.

The socket 21 releasably holds the insulating core 19 with the heating element 18 within the heating pot 7. The heating pot is completely closed except at its open top and the hole 17 in the bottom thereof and which hole is closed by the stem of the core 19. Obviously, by unscrewing the core 19 from the socket 21, the heating element 19 and its core may be removed from the heating pot 7 through the open top thereof.

Each heating pot 7 is closed by a grid 24 having an annular flange 25, the lower end portion of which extends between the shells 8 and 9 and rests on the insulating material 15 to form a relatively tight joint therebetween. The upper portion of the flange 25 is adapted to support a cooking utensil, not shown, in such a manner as to completely close the heating pot 7 and confine the heat from the heating element 18 therein. The grids 24 also have central disc-like plates 26 that overlie the heating elements 18 and completely cover the same to protect said heating elements from any materials or substances that might be spilled through the grids 24.

From the above description it is evident that the heating elements 18 may be readily removed from the stove as well as the grids 24 and heating pots for the purpose of cleaning the same, making repairs or substituting a new heating element for the old one.

What I claim is:

1. In an electric stove, a removable insulated heating pot closed except at its top, an electric socket below said pot, and a heating element in said pot having an insulating core extending through a hole therefor in the bottom of said pot, removably mounted in said socket and removably supporting the heating element.

2. In an electric stove, an insulated heating pot comprising a pair of spaced concentric shells, and an insulating material filling the space between said shells, said pot being closed except at its top, and a grid having an endless flange extending between said shells, closely engaging the insulating material and adapted to support a cooking utensil in a manner to close the open top of said pot.

3. In an electric stove, an insulated heating pot comprising spaced inner and outer shells, the latter of which has at its upper edge an external supporting flange and at its lower edge an internal flange, a bottom plate supported on said internal flange, an insulating member on the bottom plate, said inner shell being supported on the insulating member and having an internal flange at its lower edge, and an insulating material between the two shells engaging the internal flange on the inner shell and holding said shell from lifting in respect to the outer shell.

4. The structure defined in claim 3 in which the bottom plate and insulating member have aligned passages for the insulating core of a heating element.

5. The structure defined in claim 3 in further combination with a top plate having a hole in which the heating pot is removably held suspended by the engagement of the external flange of the outer shell with the top plate.

6. In an electric stove, a box-like structure having in its top a hole, an insulated heating pot removably held suspended in said structure through the hole in the top thereof, an electric socket in said structure below said pot, and a heating element in said pot having an insulating core extending through a hole therefor in the bottom of the pot, removably mounted in said socket and removably supporting the heating element in said pot.

7. The structure defined in claim 6 in which said structure has in its top air escape passages surrounding said hole and an air intake passage.

8. In an electric stove, a heating pot closed except at its top, an electric socket below said pot, and a heating element in said pot having an insulating core extending through a hole therefor in the bottom of said pot, removably mounted in said socket and removably supporting the heating element.

9. The structure defined in claim 8 in further combination with a grid for the pot adapted to support a cooking utensil in a manner to close the open top of the pot.

In testimony whereof I affix my signature.

EMIL F. WESTMAN.